United States Patent [19]

Fu

[11] Patent Number: 5,662,857
[45] Date of Patent: Sep. 2, 1997

[54] PROCESS OF MAKING AN LED REFLECTOR

[75] Inventor: Ming Shi Fu, Taipei Hsien, Taiwan

[73] Assignee: Taiwan Liton Electronic Co., Ltd., Taipei, Taiwan

[21] Appl. No.: 521,288

[22] Filed: Aug. 29, 1995

[51] Int. Cl.$^6$ ................................................. B29C 45/00
[52] U.S. Cl. ................................................. 264/328.18
[58] Field of Search ................................. 264/328.18

[56] References Cited

U.S. PATENT DOCUMENTS 4,617,618  10/1986  Baciu et al. .................. 264/328.18 X
4,699,745  10/1987  Fritsch et al. ................. 264/328.18 X

*Primary Examiner*—Leo B. Tentoni
*Attorney, Agent, or Firm*—Browdy and Neimark

[57] ABSTRACT

A LED reflector manufacturing method including the steps of i) preparing an injection molding material by mixing about 70% of polycarbonate+about 10% PBT+about 20% titanium dioxide+about 0.012% carbon powder mixture, which is obtained from one part of carbon powder with 50 parts of talc powder, to result in 100% of the injection molding material; and ii) injection-molding the injection molding material into desired reflectors at about 260° C.±15° C.

2 Claims, 3 Drawing Sheets

PROCESS OF MAKING AN LED REFLECTOR

BACKGROUND OF THE INVENTION

The present invention relates to a method of manufacturing LED reflectors for use in digital displays (calculators, time pieces, etc.).

PRIOR ART

Polycarbonate resin has nowadays been commonly used with titanium dioxide for manufacturing LED reflectors. However, epoxy resin which is used to pack LED reflectors will attack polycarbonate resin, causing titanium dioxide to be released from the LED reflectors. Furthermore, because the melting index cannot be reduced, increasing the amount of titanium dioxide will slow down material flowing speed (the maximum amount of titanium dioxide is about 9–13%), causing an error in the injection molding process. Therefore, the quality of LED reflectors cannot be greatly improved. There are also methods of injection molding LED reflectors from the mixture of noryl with titanium dioxide, PBT with titanium dioxide and glass fibers, polycarbonate with glass fibers, or PBT (polybutylene terephlybenzothiazol) with titanium dioxide. However, none of these methods has been proven satisfactory because they cannot eliminate the problem of easy deformation, low light intensity, high manufacturing cost, etc.

SUMMARY OF THE INVENTION

The present invention has been accomplished to provide a method of manufacturing LED reflectors which eliminates the aforesaid drawbacks. The LED reflector manufacturing method of the present invention includes the steps of i) preparing an injection molding material by mixing about 70% of polycarbonate+about 10% PBT+about 20% titanium dioxide+about 0.012% carbon powder mixture, which is obtained from one part of carbon powder with 50 parts of talc powder the mix resulting in 100% of the injection molding material; and ii) injection-molding the injection molding material into desired reflectors at about 260° C.±15° C. A LED reflector made according to the present invention achieves the following advantages:

1. The light chopping and reflecting power is greatly increased, therefore the brightness is about 10–20% superior over conventional products that are molded from PC (polycarbonate) resin or noryl.
2. Because carbon is added, no leakage of light will occur.
3. More diffusion agent can be added to eliminate the problem of spot of light without affecting the brightness.
4. Because the melting index is high, titanium dioxide is joined tight in the material, no sinking of resin will occur.
5. The invention eliminates the procedure of heating the reflector at 100° C. for 12 hours, which is employed in conventional reflector manufacturing methods to eliminate the problem of sinking of resin, therefore the manufacturing time is shorted.
6. Because the material cost is inexpensive, the manufacturing cost of the present invention is low.

DETAILED DESCRIPTION OF THE PREFERRED EMBODIMENT

Figure 1:
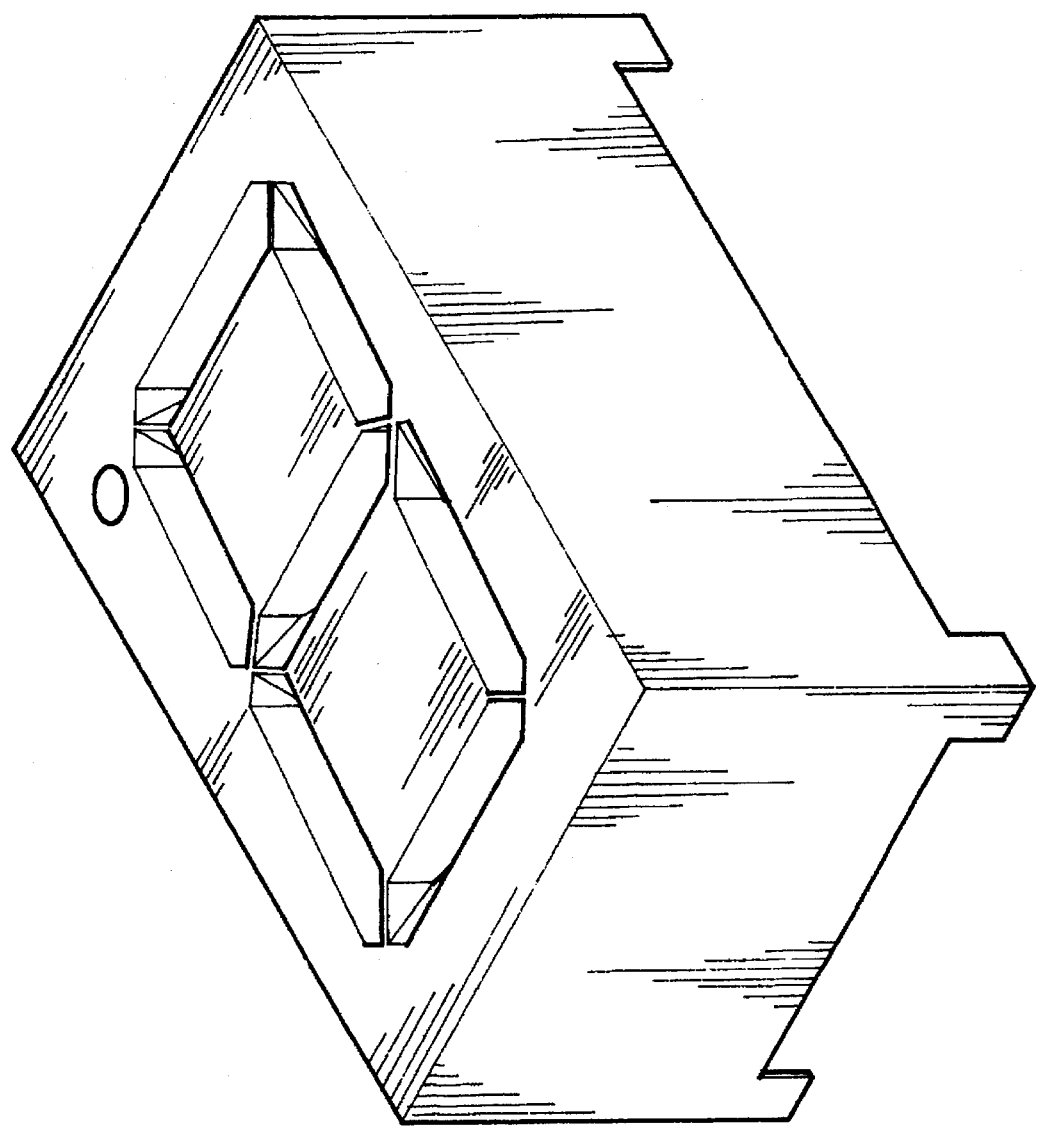
FIG. 1 shows a digital display device made according to the present invention.
Figure 2:
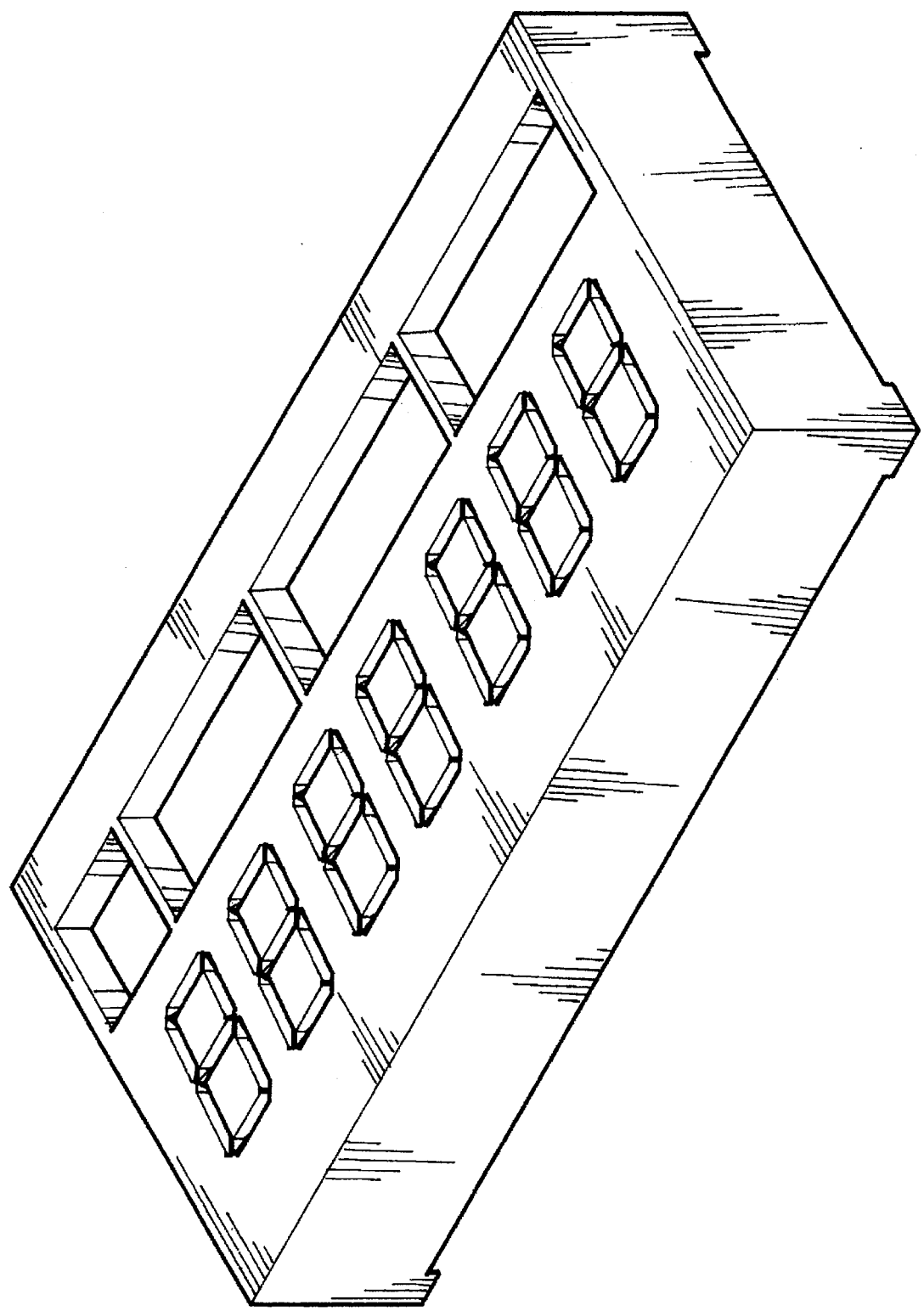
FIG. 2 shows another digital display device made according to the present invention.
Figure 3:
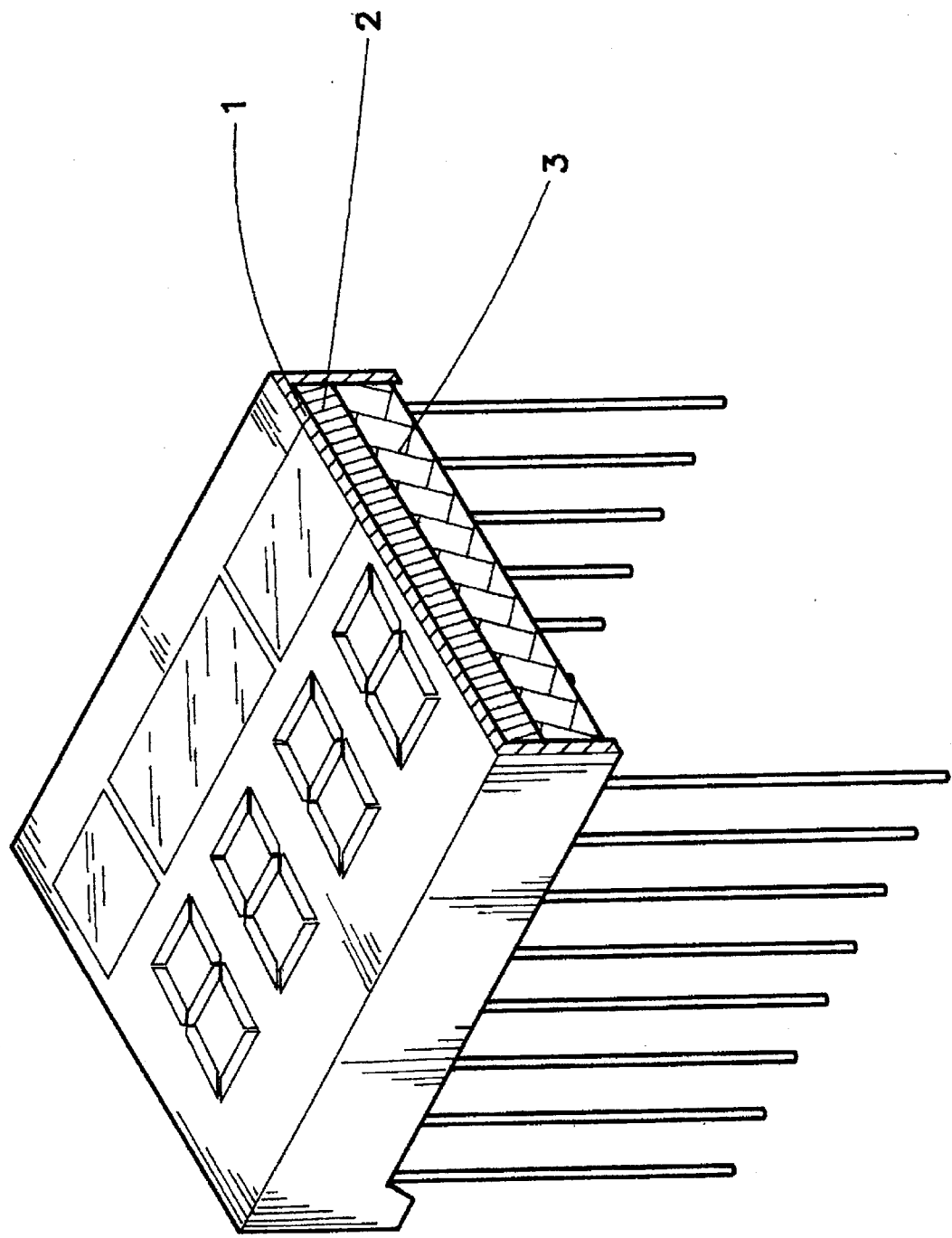
FIG. 3 is a cutaway of the digital display device shown in FIG. 2.

FIGS. 1 and 2 show two digital display devices made according to the present invention. As illustrated in FIG. 3, the digital display device comprises a reflector 1 at the top side, a protective epoxy resin layer 3 at the bottom side, and a chip 2 mounted between the reflector 1 and the protective epoxy resin layer 3.

The aforesaid reflector 1 is made by:

1) preparing an injection molding material by mixing about 70% of polycarbonate+about 10% PBT+about 20% titanium dioxide+about 0.012% carbon powder mixture (which is obtained from one part of carbon powder with 50 parts of talc powder) the mix resulting in 100% of the injection molding material; and
2) injection-molding the injection molding material into the desired reflector at about 260° C.±15° C., The following test reports show the superiority of LED reflectors made according to the present invention over the prior art products.

TABLE I

| ITEM | TiO2 CONTENT | COMPOSITION |
| --- | --- | --- |
| PRODUCT A | 8–12% | 90% PC + TiO2 |
| PRODUCT B | 19–20% | 70% PC + 10% PBT + TiO2 |

Remark:
Product A: prior art product
Product B: the invention

TABLE II

| Material property application test | | | |
| --- | --- | --- | --- |
| | WHITENESS | FLOWING SPEED (MI) | CONTRACTION PERCENTAGE |
| A | 77% | 1.63 g/min | 0.3–0.4% |
| | EXTENSIVE PROPERTY | IMPACT RESISTANCE | FLEXURAL STRENGTH |
| A | 580 Kg/cmsq | 50 Kg/cmsq | 880 Kg/cmsq |
| B | 540 Kg/cmsq | 40 Kg/cmsq | 880 Kg/cmsq |
| | HEAT DEFORMATION TP | GLASS TURNING POINT | HEAT EXPANSION INDEX |
| A | 125° C. | 116° C. | 70.5 um/m°C. |
| B | 126° C. | 127° C. | 71.8 um/m°C. |

TABLE III

| PC ATTRACT TEST | | |
| --- | --- | --- |
| | RESIN SINKING UNDER SPECIAL CONDITIONS | RESIN SINKING UNDER NORMAL CONDITIONS |
| A | 100% | 0% |
| B | 0–2% | 0% |

Remark: Special conditions: a. pre-heated at 85° C. for 20 seconds; b. vacuumized twice; c. pre-heated at 90° C. for 2 hours.

Normal conditions: a. pre-heated at 65° C. for 5 minutes; b. vacuumized once; c. pre-heated at 85° C. for 2 hours.

TABLE IV

BRIGHTNESS TEST

BRIGHTNESS

| | | SEMI-FINISHED PRODUCT | FINISHED PRODUCT | PERCENTAGE INCREASED |
|---|---|---|---|---|
| A | MAX. | 1810 | 3770 | |
| | MIN. | 1660 | 3380 | 2.07 |
| | AVE. | 1716 | 3556 | |
| B | MAX. | 1810 | 3770 | |
| | MIN. | 1660 | 3380 | 2.14 |
| | AVE. | 1716 | 3556 | |

Remarks:
1. The brightness of the present invention is increased by 7% over the prior art
2. The epoxy resin used containing a dyeing agent.

BRIGHTNESS

| | | SEMI-FINISHED PRODUCT | FINISHED PRODUCT | PERCENTAGE INCREASED |
|---|---|---|---|---|
| A | MAX. | 1880 | 3220 | |
| | MIN. | 1500 | 2680 | 1.65 |
| | AVE. | 1748 | 2894 | |
| B | MAX. | 1750 | 3113 | |
| | MIN. | 1630 | 2950 | 1.81 |
| | AVE. | 1700 | 3007 | |

Remarks:
1. The brightness of the present invention is increased by 16% over the prior art
2. The epoxy resin used without containing any dyeing agent.

TABLE V

COMPATIBILITY WITH INK

| | COMPATIBILITY WITH PC & UV INK | ACCEPTABILITY |
|---|---|---|
| A | PC INK: GREY UV INK: RED, BLACK, YELLOW ORANGE | GOOD |
| B | PC INK: GREY UV INK: RED, BLACK, YELLOW ORANGE | MORE BETTER |

TABLE VI

TEST ON DIMENSION CHANGE

| | | LENGTH mm | WIDTH mm | CURVATURE | RESULT |
|---|---|---|---|---|---|
| UNPROCESSED PRODUCT | MAX. | 36.41 | 19.22 | 0.18 | ACCEPTABLE |
| | MIN. | 36.34 | 19.10 | 0.03 | |
| | AVE. | 36.37 | 19.18 | 0.08 | |
| AFTER INKING | MAX. | 36.41 | 19.22 | 0.18 | ACCEPTABLE |
| | MIN. | 36.34 | 19.10 | 0.03 | |
| | AVE. | 36.37 | 19.18 | 0.08 | |
| AFTER RESIN MOLDING | MAX. | 36.33 | 19.22 | 0.20 | ACCEPTABLE |
| | MIN. | 36.27 | 19.12 | 0.17 | |
| | AVE. | 36.30 | 19.16 | 0.14 | |

TABLE VII

TEST ON PRODUCT USING RECLAIMED POLYCARBONATE RESIN

| | IMPACT RESISTANCE kg/cmsq | WHITENESS | YELLOWISHNESS |
|---|---|---|---|
| PURE PC RESIN | 42.1 | 86.04 | 2.75 |
| PRIMARILY RECLAIMED | 41.1 | 85.45 | 2.70 |
| SECONDARILY RECLAIMED | 34.5 | 85.39 | 2.73 |
| THIRDLY RECLAIMED | 31.8 | 85.36 | 2.74 |
| FOURTHLY RECLAIMED | 28.8 | 85.52 | 2.73 |
| FIFTHFLY RECLAIMED | 26.9 | 85.85 | 2.69 |

The test results show that the whiteness of reclaimed polycarbonate resin is not affected. The impact resistance can be controlled by changing the percentage of reclaimed polycarbonate resin amount.

Other tests on the products of the present invention include:

1. Stripping test: adhering a 3M #600 adhesive tape to the surface of the product, then pressing tight the adhesive tape with the fingers, and then detaching the adhesive tape from the product. The result shows no that part of the product is peeled off.

2. Anti-corrosion test: dipping the product in a freon and TMS solution and oscillated by ultrasonic waves. The test result shows no sign of corrosion.

3. Reliability test: oscillating the product under the conditions of:
   a) 85°±5° C.→−35°±5° C.→85°±5° C.→35°±5° C. (50 times) 10 min. 10 min. 10 min. 10 min. The result shows no crack occurred.
   b) (60 times) (32 times) humility/temp. 75° C./25° C./−35° C./25° C.→85° C./−40° C.→90–95%RH/1 hr 12 min 1 hr 12 min 1 hr 1 hr 25° C.,240 hr The test result shows no sign of defection.

I claim:

1. A LED reflector manufacturing method including the steps of:

i) preparing an injection molding material by mixing about 70% of polycarbonate+about 10% PBT+about 20% titanium dioxide+about 0.012% carbon powder mixture, which is obtained from one part of carbon powder with 50 parts of talc powder said mix resulting in 100% of the injection molding material; and ii) injection-molding the injection molding material into desired LED reflectors at about 260° C.±15° C.

2. The LED reflector manufacturing method of claim 1 wherein the desired reflectors are injection-molded from the injection molding material at 270° C.

* * * * *